(12) United States Patent
Sawada

(10) Patent No.: US 11,340,574 B2
(45) Date of Patent: May 24, 2022

(54) CONTROL SYSTEM, COMMUNICATION CONTROL METHOD FOR CONTROL SYSTEM, AND JUNCTION DEVICE

(71) Applicant: OMRON Corporation, Kyoto (JP)

(72) Inventor: Shigenori Sawada, Takatsuki (JP)

(73) Assignee: OMRON Corporation, Kyoto (JP)

( * ) Notice: Subject to any disclaimer, the term of this patent is extended or adjusted under 35 U.S.C. 154(b) by 259 days.

(21) Appl. No.: 16/643,581

(22) PCT Filed: Sep. 26, 2018

(86) PCT No.: PCT/JP2018/035603
§ 371 (c)(1),
(2) Date: Mar. 1, 2020

(87) PCT Pub. No.: WO2019/082579
PCT Pub. Date: May 2, 2019

(65) Prior Publication Data
US 2021/0157293 A1 May 27, 2021

(30) Foreign Application Priority Data
Oct. 26, 2017 (JP) .............................. JP2017-207238

(51) Int. Cl.
*G05B 19/05* (2006.01)
*H04L 12/46* (2006.01)

(52) U.S. Cl.
CPC ......... *G05B 19/058* (2013.01); *G05B 19/054* (2013.01); *H04L 12/46* (2013.01)

(58) Field of Classification Search
None
See application file for complete search history.

(56) References Cited

U.S. PATENT DOCUMENTS

| 2017/0242693 | A1 | 8/2017 | Izaki |
| 2017/0248932 | A1 | 8/2017 | Takeuchi et al. |
| 2020/0273268 | A1* | 8/2020 | Bhattacharyya ........................... H04L 12/40169 |

FOREIGN PATENT DOCUMENTS

| JP | 2003-150211 A | 5/2003 |
| JP | 2009-146039 A | 7/2009 |

(Continued)

OTHER PUBLICATIONS

English translation of the International Search Report("ISR") of PCT/JP2018/035603 dated Jan. 8, 2019.
(Continued)

*Primary Examiner* — Robert M Morlan
(74) *Attorney, Agent, or Firm* — Metrolex IP Law Group, PLLC

(57) ABSTRACT

The junction device includes a first error detection means that detects a transmission error by monitoring the periodic reception of a first communication frame, and a state switching means that switches, when a transmission error is detected by the first error detection means, a state of the junction device to either a first state in which the signal output from all of the functional units connected to the junction device is disabled or a second state in which the signal output from some of the functional units connected to the junction device is continuously updated based on the configuration of each functional unit connected to the junction device.

17 Claims, 14 Drawing Sheets

(56) References Cited

FOREIGN PATENT DOCUMENTS

JP  2012-235335 A  11/2012
JP  2017-151934 A  8/2017

OTHER PUBLICATIONS

Written Opinion("WO") of PCT/JP2018/035603 dated Jan. 8, 2019.
Liu et al.,"EtherCAT-based Functional Safety-Integrated Communication", Mar. 3, 2012, XP055811003, Retrieved from the Internet [retrieved on Jun. 7, 2021].
Extended European search report (EESR) dated Jun. 15, 2021 in a counterpart European patent application.

* cited by examiner

CONTROL SYSTEM, COMMUNICATION CONTROL METHOD FOR CONTROL SYSTEM, AND JUNCTION DEVICE

TECHNICAL FIELD

The present invention relates to a control system including a junction device, a communication control method for the control system, and a junction device for the control system.

BACKGROUND ART

In order to ensure safety of a facility or a machine in various manufacturing sites, a safety component that complies with international standards must be used. The safety component is designed to prevent an automatically moving device such as a robot from threatening human safety. The safety component may be a safety controller that executes a safety program, a detection device that detects the presence or entry of a person, an input device that receives an emergency operation, or an output device that stops a facility or a machine.

On the other hand, size reduction and space saving of a facility is required at the manufacturing site. In response to such a requirement, for example, Japanese Patent Laying-Open No. 2009-146039 (PTL 1) discloses a safety control system which includes a programmable controller (PLC) that performs general controls and a safety controller (SC) that performs safety controls such as an emergency stop so as to prevent workers from being exposed to dangers as much as possible while controlling the manufacturing facilities or the like.

CITATION LIST

Patent Literature

PTL 1: Japanese Patent Laying-Open No. 2009-146039

SUMMARY OF INVENTION

Technical Problem

In addition to the configuration in which the programmable controller and the safety controller are integrated as described in the above, there is also known such a configuration that the safety controller is connected to the programmable controller via a network. In such a case, a junction device called a coupler unit is used to connect the safety controller to a network. When a junction device is used, it is assumed that the safety controller and the safety input/output unit are connected to the junction device which is connected to the network together with an input/output unit that performs standard control.

Even though the safety controller and the safety input/output unit that perform safety control and the input/output unit that performs standard control are connected to a common junction device, the standard control and the safety control may be performed independently. An object of the present invention is to provide a control system or the like that meets the requirements mentioned above.

Solution to Problem

A control system according to an embodiment of the present disclosure includes a control device that functions as a communication master, a junction device that is connected via a network to the control device, and one or more field devices that are connected via the network to the control device. The junction device is connected to one or more functional units. The control device includes a transmission management means that manages the periodic transmission of a first communication frame in the network. The junction device includes a first error detection means that detects a transmission error by monitoring the periodic reception of the first communication frame, and a state switching means that switches, when a transmission error is detected by the first error detection means, a state of the junction device to either a first state in which the signal output from all of the functional units connected to the junction device is disabled or a second state in which the signal output from some of the functional units connected to the junction device is continuously updated based on the configuration of each functional unit connected to the junction device.

According to the present disclosure, when a transmission error is detected by monitoring the periodic reception of the first communication frame, the state of the junction device may be selectively switched to either a first state in which the signal output from all of the functional units connected to the junction device is disabled or a second state in which the signal output from some of the functional units connected to the junction device is continuously updated based on the configuration of each functional unit connected to the junction device. Thus, in a case where the functional units that perform different controls are connected to a common junction device, it is possible to prevent the other controls from being stopped due to an error related to only one control.

In the above disclosure, the one or more functional units may include at least one of a safety controller and a safety input/output unit, and the safety controller and the safety input/output unit may continue updating the signal output in the second state.

According to the present disclosure, the function provided by the present disclosure such as the safety controller or the safety input/output unit is particularly effective in a system in which the stop of the safety control is directly linked to the stop of a target facility or machine.

In the above disclosure, the safety controller and the safety input/output unit may exchange data with the field device using a second communication frame different from the first communication frame that is transmitted periodically.

According to the present disclosure, the safety controller and the safety input/output unit may employ a communication frame that conforms to a special protocol and is different from the first communication frame related to the standard control. Thereby, it is possible to meet the communication requirements or the like for safety control.

In the above disclosure, the junction device may transmit the second communication frame to the control device in response to a request from at least one of the safety controller and the safety input/output unit, and the control device may further include a frame transmission means that transmits the second communication frame received from the junction device to the field device.

According to the present disclosure, when transmitting the second communication frame from the junction device to a specific field device, the junction device is not required to know the address of the destination field device in advance, it is only required to transmit the second communication frame to the control device, which makes the transmission process simpler.

In the above disclosure, the junction device may further include an individual configuration means that configures each of the functional units connected to the junction device as a functional unit that uses the first communication frame and a functional unit that uses the second communication frame.

According to the present disclosure, different control functions may be assigned to a plurality of functional units connected to the junction device.

In the above disclosure, the junction device may further include a second error detection means that detects a transmission error in the second communication frame, and the state switching means may switch the state to the first state when a transmission error is detected by the second error detection means.

According to the present disclosure, when the transmission error in the second communication frame is more critical than the transmission error in the first communication frame, the signal output from all of the functional units connected to the junction device is disabled so as to maintain the facility or the machine in a safer state.

In the above disclosure, the junction device may further include a notification means that notifies the control device of information indicating a state to be switched to when a transmission error is detected by the first error detection means.

According to the present disclosure, it is possible to easily notify the control device that serves as the communication master of the state switching of the junction device that functions as the communication slave, which makes it possible to manage the transmission of the communication frame from the control device as necessary.

In the above disclosure, the junction device may further include an output determination means that determines the content of a signal output for a functional unit according to a predefined configuration after the signal output of the functional unit is disabled.

According to the present disclosure, the signal output for each functional unit whose signal output has been disabled due to a transmission error may be determined according to the type or usage of each functional unit.

According to an embodiment of the present disclosure, a communication control method for a control system is provided. The control system includes a control device that functions as a communication master, a junction device that is connected via a network to the control device, and one or more field devices that are connected via a network to the control device. The junction device is connected to one or more functional units. The communication control method includes managing the periodic transmission of a first communication frame in the network, detecting a transmission error by using the junction device to monitor the periodic reception of the first communication frame, and switching, when a transmission error is detected in the first communication frame, a state of the junction device to either a first state in which the signal output from all of the functional units connected to the junction device is disabled or a second state in which the signal output from some of the functional units connected to the junction device is continuously updated based on the configuration of each functional unit connected to the junction device.

According to the present disclosure, when a transmission error is detected by monitoring the periodic reception of the first communication frame, the state of the junction device may be selectively switched to either a first state in which the signal output from all of the functional units connected to the junction device is disabled or a second state in which the signal output from some of the functional units connected to the junction device is continuously updated based on the configuration of each functional unit connected to the junction device. Thus, in a case where the functional units that perform different controls are connected to a common junction device, it is possible to prevent the other controls from being stopped due to an error related to only one control.

According to an embodiment of the present disclosure, a junction device included in a control system is provided. The control system includes a control device that is connected to the junction device via a network and functions as a communication master, and one or more field devices that are connected to the control device via a network. The junction device is connected to one or more functional units. The control device includes a transmission management means that manages the periodic transmission of a first communication frame in the network. The junction device includes a first error detection means that detects a transmission error by monitoring the periodic reception of the first communication frame, and a state switching means that switches, when a transmission error is detected by the first error detection means, a state of the junction device to either a first state in which the signal output from all of the functional units connected to the junction device is disabled or a second state in which the signal output from some of the functional units connected to the junction device is continuously updated based on the configuration of each functional unit connected to the junction device.

According to the present disclosure, when a transmission error is detected by monitoring the periodic reception of the first communication frame, the state of the junction device may be selectively switched to either a first state in which the signal output from all of the functional units connected to the junction device is disabled or a second state in which the signal output from some of the functional units connected to the junction device is continuously updated based on the configuration of each functional unit connected to the junction device. Thus, in a case where the functional units that perform different controls are connected to a common junction device, it is possible to prevent the other controls from being stopped due to an error related to only one control.

Advantageous Effects of Invention

According to the present disclosure, when a transmission error is detected, it is possible to limit the function units whose signal output is disabled to a minimum range, which makes it possible to prevent the other controls from being stopped due to an error related to only one control when different controls are being performed independently.

DESCRIPTION OF EMBODIMENTS

Figure 1:
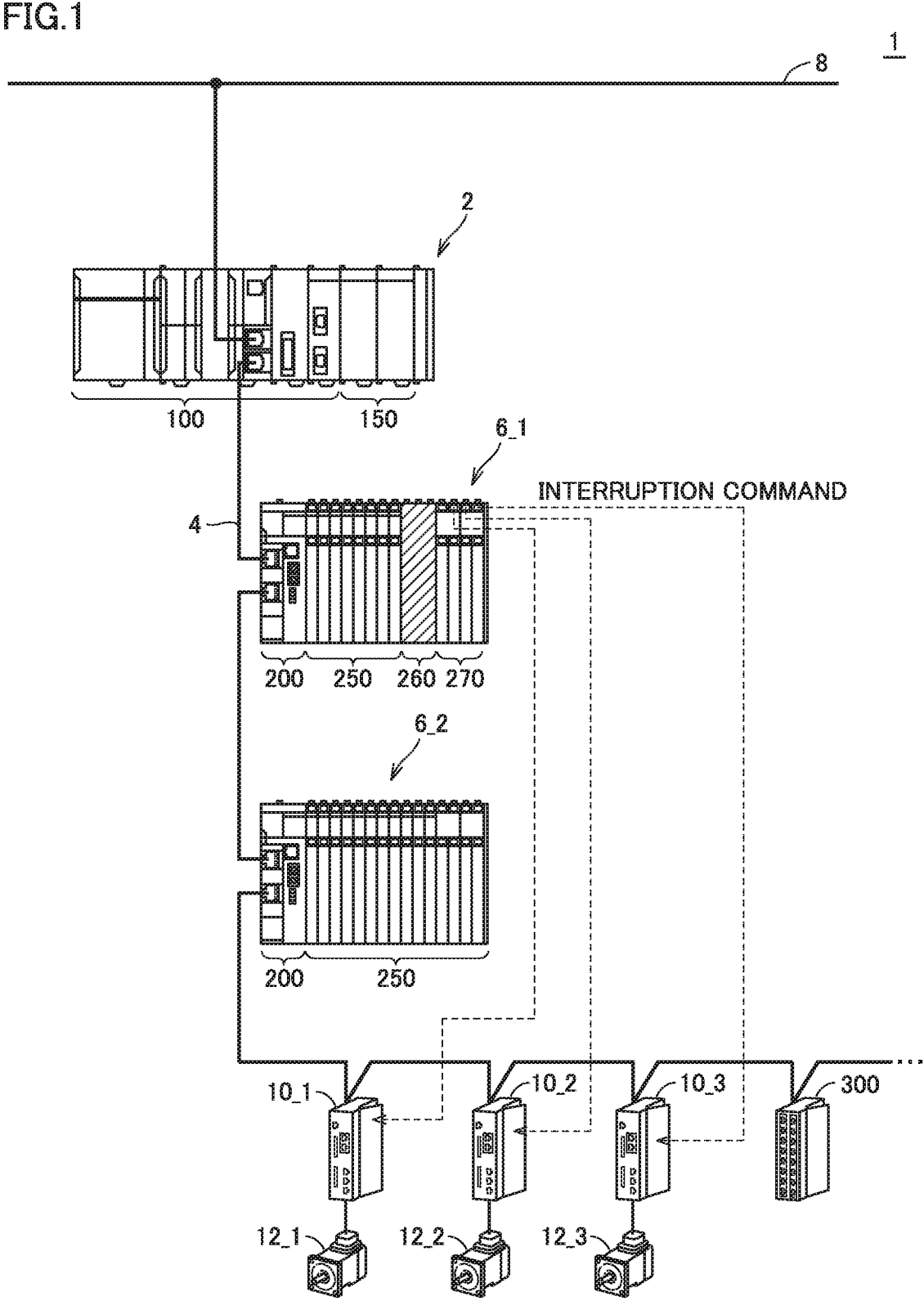
FIG. 1 is a schematic diagram illustrating an overall configuration example of a control system according to the present embodiment.

An embodiment of the present invention will be described in detail with reference to the drawings. Note that the same or corresponding portions in the drawings will be denoted by the same reference numbers, and the description thereof will not be repeated.

A. Application Example

First, an example to which the present invention is applied will be described with reference to FIGS. 1 to 3.

FIG. 1 is a schematic diagram illustrating an overall configuration example of a control system 1 according to the present embodiment. With reference to FIG. 1, the control system 1 includes, as main components, a master device 2 that functions as a communication master, and communication slaves that are connected to the master device 2 via a field network 4. As illustrated in FIG. 1, the communication slaves include, for example, remote IO devices 6_1 and 6_2 (hereinafter will be collectively referred to as "remote IO device 6"), servo drivers 10_1, 10_2 and 10_3 (hereinafter will be collectively referred to as "servo driver 10") each of which serves as an example of field devices, and a safety input/output unit 300.

In the present specification, the term of "field network" is a generally used to represent a communication medium that performs data transmission in industrial devices, and is also referred to as a "field bus". Typically, a protocol that guarantees the data arrival time between nodes in the network is employed as the field network 4. For example, EtherCAT (registered trademark) may be employed as a protocol that guarantees the data arrival time between nodes. Alternatively, EtherNet/IP (registered trademark), DeviceNet (registered trademark), CompoNet (registered trademark) or the like may also be employed. In the following, the description will be carried out on a case where EtherCAT is employed as the field network 4.

In the present specification, the term of "communication master" or "master" is generally used to represent an entity or a feature that manages data transmission in a target network. The term of "communication slave" or "slave" is used in pair with the term of "communication master" or "master". In the present specification, the term of "communication slave" or "slave" is generally used to represent an entity or a feature that is arranged in a target network and configured to perform data transmission under the control of a master.

The master device 2 includes a CPU unit 100 and one or more input/output units 150 connected to the CPU unit 100. As to be described later, the CPU unit 100 controls a target such as a facility or a machine by executing a user program.

The CPU unit 100 may be further connected to a host network 8. The host network 8 may be connected by another master device or any information processing device such as a gateway or a database server.

The remote IO device 6_1 includes a coupler unit 200, an input/output unit 250 connected to the coupler unit 200, a safety controller 260, and a safety input/output unit 270. The remote IO device 6_2 includes a coupler unit 200 and an input/output unit 250 connected to the coupler unit 200.

The coupler unit 200 is a junction device that is connected to the CPU unit 100 via a network. Specifically, the coupler unit 200 outputs data transmitted from the CPU unit 100 via the network to the functional units connected to the coupler unit 200, and sends data from any of the functional units connected to the coupler unit 200 over the network. In other words, the coupler unit 200 relays data between the field network 4 and the internal bus provided by the coupler unit 200.

In the present specification, the term of "functional unit" is generally used to represent a device which is connected to a control device (such as the CPU unit 100) or a junction device (such as the coupler unit 200) and configured to exchange various signals with a control target. The functional unit includes at least the input/output units 150 and 250, the safety controller 260, and the safety input/output unit 270 illustrated in FIG. 1. The functional unit may further include a safety input/output unit 300 or the like connected to the field network 4.

The input/output units 150 and 250 may have one or more functions such as a DI (Digital Input) function of receiving a digital signal from a control target, a DO (Digital Output) function of outputting a digital signal to the control target, an AI (Analog Input) function of receiving an analog signal from the control target, and an AO (Analog Output) function of outputting an analog signal to the control target. In addition, the functional unit may include a controller that is implemented with special functions such as a PID (Proportional Integral Derivative) control and a motion control.

The safety controller 260, which is an example of a functional unit, performs a safety control independently of the CPU unit 100. In the configuration example illustrated in FIG. 1, generally, the CPU unit 100 performs the standard control for controlling a control target, and the safety controller 260 performs the safety control for preventing the control target from causing any dangers. The safety controller 260 exchanges data with a field device or the like via the coupler unit 200 connected to the field network 4.

The safety input/output unit 270, which is an example of a functional unit, performs the safety control together with the safety controller 260. Compared with a standard input/output unit, the safety input/output unit 270 may detect, for example, a feedback signal indicating whether or not a safety device is actually being driven in response to a command value.

The safety input/output unit 300 is similar to the safety input/output unit 270 except that it is provided with an interface to form a direct connection to the field network 4.

In the present specification, the term of "standard control" is generally used to represent a process of sequentially generating commands for controlling a control target in accordance with predetermined requirements. On the other hand, in the present specification, the term of "safety control" is generally used to represent a process of generating a command for preventing the control target from threatening human safety due to a malfunction or the like. The safety control includes, for example, a process of stopping the control target not only when the behavior of the control target is different from the designed behavior but also when it is determined that the control system 1 is not performing the control properly.

In the present specification, the term of "field devices" is generally used to represent any devices that may be connected to each other via the field network 4. The field devices may include various devices such as a robot controller, a temperature controller and a flow rate controller in addition to the servo driver 10 illustrated in FIG. 1.

The servo drivers 10_1, 10_2, and 10_3 are driving sources that respectively drive servo motors 12_1, 12_2 and 12_3 (hereinafter will be collectively referred to as "servo motor 12"). Each of the servo drivers 10 drives a corresponding servo motor 12 in response to a command or the like (transmitted via the field network 4) from a functional unit connected to the CPU unit 100 and/or a functional unit connected to the coupler unit 200. As to be described later, the servo driver 10 may bring the corresponding servo motor 12 into emergency stop in response to a command from the safety controller 260 (or the safety input/output unit 270) or the safety input/output unit 300.

Figure 2:
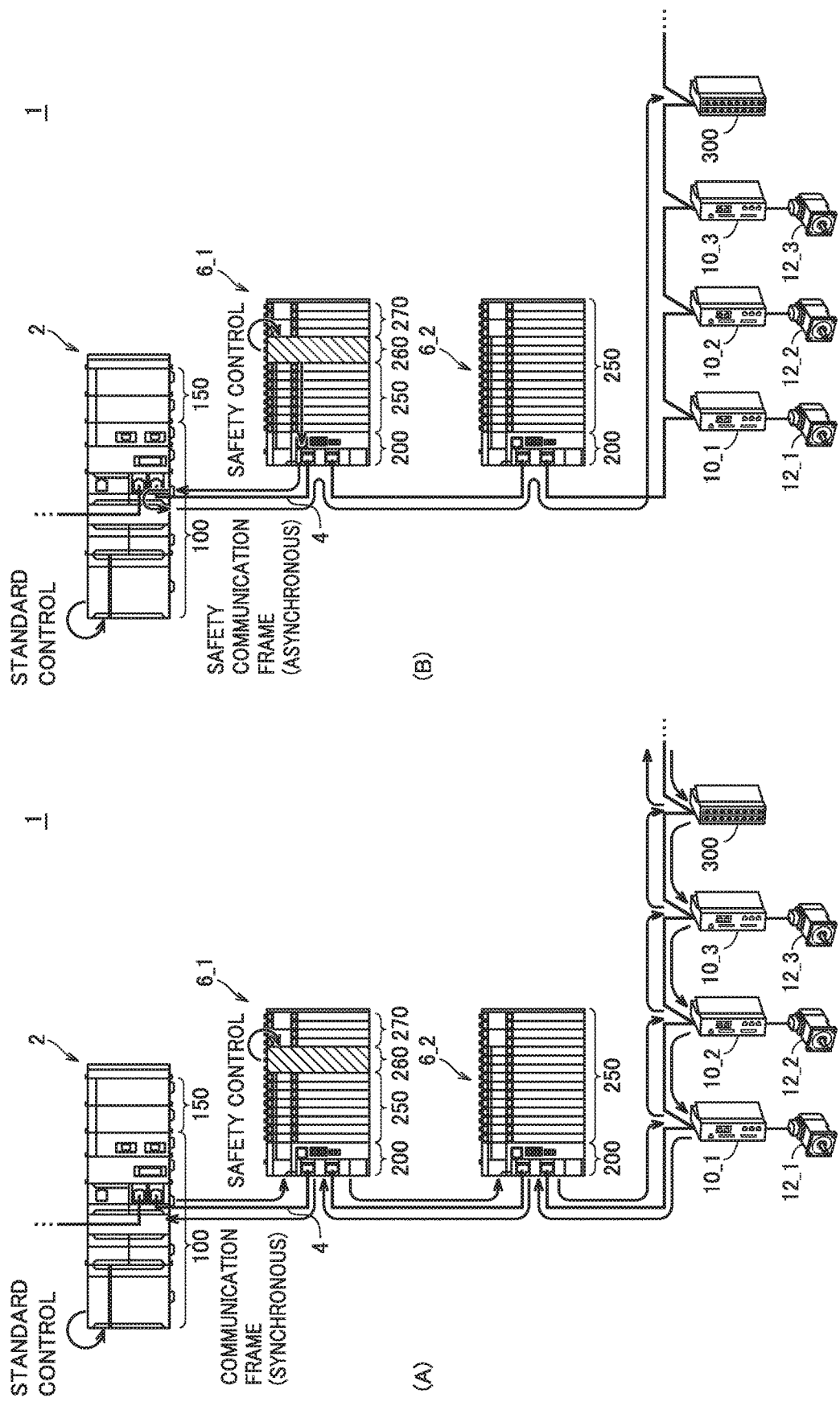
FIG. 2 is a schematic diagram illustrating data transmission in the control system according to the present embodiment.

FIG. 2 is a schematic diagram illustrating data transmission in the control system 1 according to the present embodiment. FIG. 2A illustrates a communication frame periodically transmitted for standard control, and FIG. 2B illustrates a communication frame for safety control (hereinafter will be referred to as "safety communication frame" for the convenience of description).

As illustrated in FIG. 2, in the control system 1, the CPU unit 100 of the master device 2 performs the standard control by executing a user program, and the safety controller 260 of the remote IO device 6_1 performs the safety control by executing a safety program.

As illustrated in FIG. 2A, the communication frame for standard control is transmitted periodically over the field network 4. More specifically, the CPU unit 100, which serves as the communication master, generates a communication frame at a predetermined period and transmits the communication frame to a communication slave via the field network 4. The communication frame is sequentially transmitted between the communication slaves via the field network 4 and finally returned to the CPU unit 100. Each communication slave, after receiving a communication frame from a preceding communication slave, reads out data (output data/command) addressed to the communication slave itself from the received communication frame, and writes data (input data/measured data) previously collected by the communication slave itself into the communication frame and transmit the same to a next communication slave. By repeating the periodic transmission of the communication frame, it is possible to output a command from the CPU unit 100 to each communication slave and collect field data from each communication slave. Thus, the communication frame for standard control is synchronously transmitted at a predetermined timing over the field network 4.

As illustrated in FIG. 2B, the safety communication frame is transmitted in accordance with a protocol that can reliably transmit data to one or more destinations. As an example, FSoE (Functional Safety over EtherCAT) may be employed. In the example as illustrated in FIG. 2, the safety communication frame is routed by the communication master.

The description will be carried out by using an example where data is transmitted from the safety controller 260 to the safety input/output unit 270. First, the coupler unit 200 generates a safety communication frame in response to a request from the safety controller 260, and transmits the generated safety communication frame to the CPU unit 100 via the field network 4. The CPU unit 100 transmits the received safety communication frame back to the coupler unit 200 via the field network 4 without making any change. Then, the coupler unit 200 transmits the safety communication frame to the safety input/output unit 270, which is the original destination. Through such a path, the safety communication frame is transmitted from the transmission source to the transmission destination. As described above, the communication frame for safety control (safety communication frame) is asynchronously transmitted over the field network 4.

In the case of communication in a reverse direction, the coupler unit 200 generates a safety communication frame in response to a request from the safety input/output unit 270, and transmits the generated safety communication frame to the CPU unit 100 via the field network 4. The communication frame is transmitted to the safety controller 260 in the same procedure as that described above.

Similarly, the safety communication frame transmitted from the safety input/output unit 300 is transmitted in the same procedure as that described above.

As described above, the safety controller 260, the safety input/output unit 270 and the safety input/output unit 300 exchange data with a field device using a second communication frame different from a first communication frame transmitted periodically.

Figure 3:
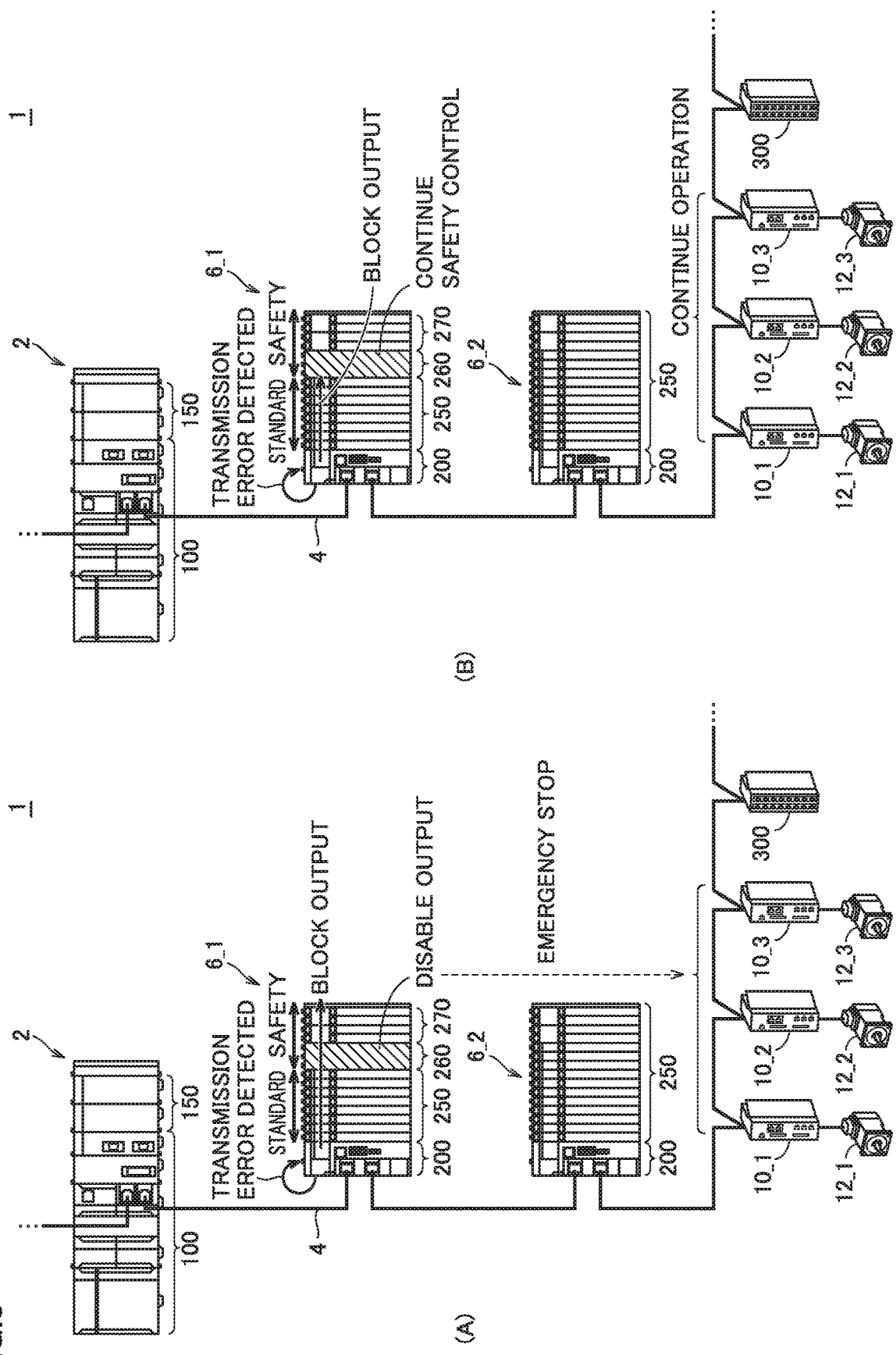
FIG. 3 is a schematic diagram illustrating processes to be performed when a transmission error is detected in the control system according to the present embodiment.

FIG. 3 is a schematic diagram illustrating processes to be performed when a transmission error is detected in the control system 1 according to the present embodiment. FIG. 3 illustrates a process according to a related art of the present invention as (a), and FIG. 3 illustrates a process according to the present embodiment as (b).

With reference to (a) of FIG. 3, the coupler unit 200 monitors the periodic reception of a communication frame. For example, when the reception failure of the communication frame continues for a predetermined period or when a period during which the communication frame cannot be received is longer than a predetermined period, the coupler unit 200 determines that a transmission error is present. In other words, the coupler unit 200 detects a transmission error by monitoring the periodic reception of a communication frame.

Upon detecting a transmission error, the coupler unit 200 generates an output block signal, and disables the signal output of all of the functional units connected to the coupler unit 200. At this time, since the output block signal is generated by the coupler unit 200 regardless of the type of the functional units connected to the coupler unit 200, the updating of the signal output from the safety controller 260 is also stopped. As a result, an emergency stop command is also issued to the field devices under the safety control by the safety controller 260. In the example illustrated in (a) of FIG. 3A, since the data transmission from the safety controller 260 to the safety input/output unit 270 is stopped, the servo drivers 10_1, 10_2, and 10_3 are brought into emergency stop by a command from the safety input/output unit 270.

Further, since the coupler unit 200 controls the state of communication to stop the processes on the output side, which also stops the reception process of the communication frame for safety control (safety communication frame), and as a result, the field devices such as the safety input/output unit 300 that exchanges the safety communication frame with the safety controller 260 are also brought into to emergency stop or a safety state close to emergency stop.

As described above, there is no relation between the communication frame periodically transmitted for standard control and the safety communication frame for safety control in terms of transmission timing, data content or the like. Further, even when a transmission error (such as an error in which the communication frame cannot be received) occurs as described above, there may be no error in the transmission of the safety communication frame.

In such a case, it is preferable to at least allow the safety controller 260 to continue operation. Therefore, in the control system 1 according to the present embodiment, even if an error is present in a communication frame that is transmitted periodically, if a predetermined condition is satisfied, some of the functional units in the safety controller 260 may continue operation.

Thus, the safety control performed by the safety controller 260 is continued. As a result, the servo drivers 10_1, 10_2 and 10_3 are not brought into emergency stop but continue to operate under the safety control by the safety controller 260.

As described above, when a transmission error (such as an error in which the communication frame cannot be received) is detected, the state of the coupler unit 200 is switched to either a first state in which the signal output from all of the functional units connected to the junction device (the coupler unit 200) is disabled or a second state in which the signal output from some of the functional units connected to the junction device (the coupler unit 200) is continuously updated based on the configuration of each functional unit connected to the coupler unit 200.

Owing to such a state switching, in the case where a plurality of functional units connected to the common coupler unit 200 perform controls independently, all the controls will not be stopped due to an event such as a transmission error in the communication frame or the like, but instead, only those controls that may be affected will be appropriately stopped while allowing the remaining healthy controls to be performed continuously, which may prevent any business loss such as preventing manufacturing lines from being stopped unnecessarily.

Hereinafter, a specific example of the control system 1 according to the present embodiment will be described in more detail.

B. Hardware Configuration Example

Next, a hardware configuration example of main components included in the control system 1 according to the present embodiment will be described.

(b1: CPU Unit 100)

Figure 4:
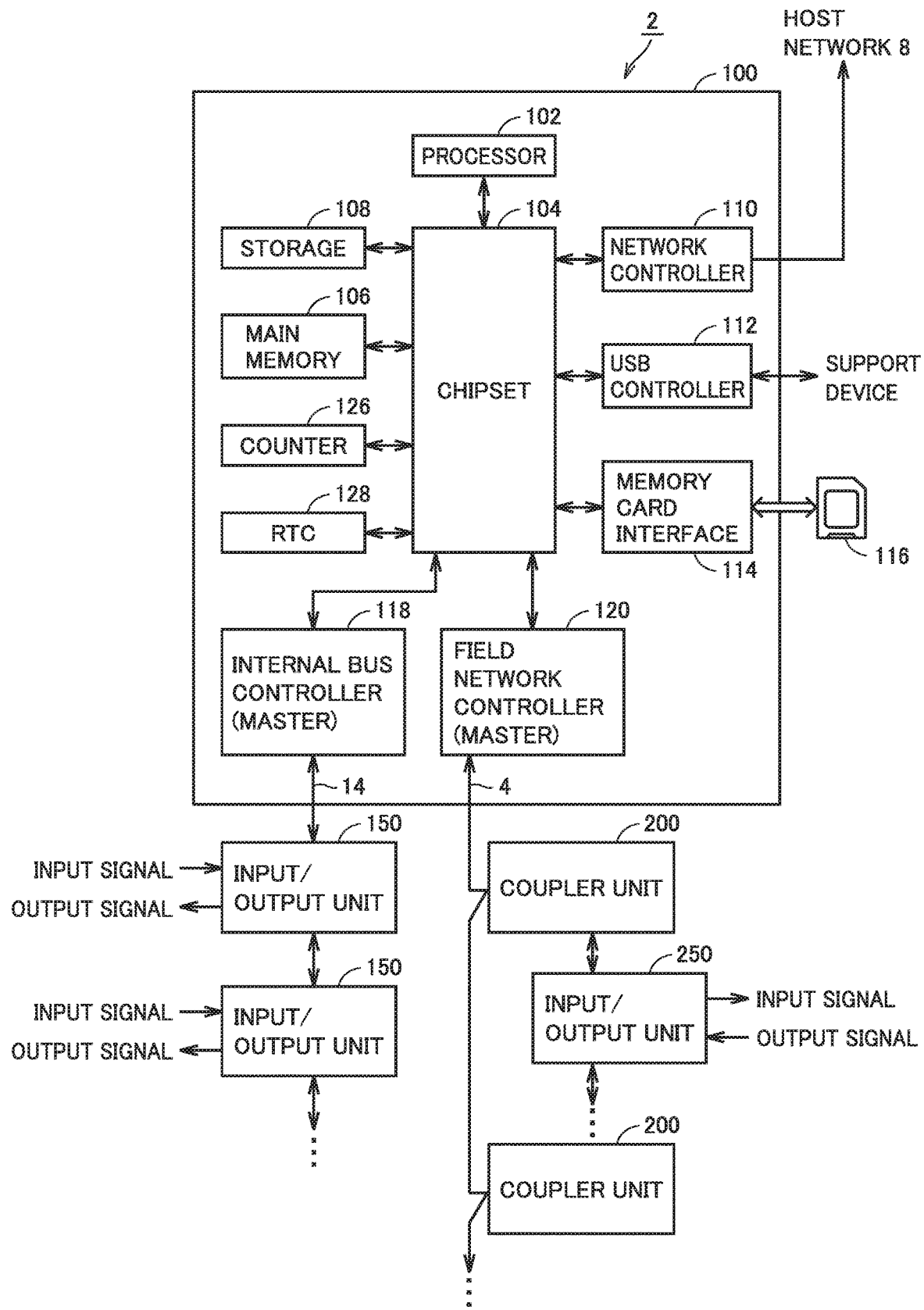
FIG. 4 is a block diagram illustrating a hardware configuration example of a CPU unit included in the control system according to the present embodiment.

FIG. 4 is a block diagram illustrating a hardware configuration example of the CPU unit 100 included in the control system 1 according to the present embodiment. With reference to FIG. 4, the CPU unit 100 includes a processor 102, a chipset 104, a memory 106, a storage 108, a network controller 110, a USB (Universal Serial Bus) controller 112, a memory card interface 114, an internal bus controller 118, a field network controller 120, a counter 126, and an RTC (Real Time Clock) 128.

The processor 102 corresponds to an arithmetic processing unit that performs a control operation or the like, and includes a CPU, an MPU, a GPU, and the like. Specifically, the processor 102 reads out a program (for example, a system program and a user program) stored in the storage 108, deploys and executes the program in the memory 106 so as to control a target or implement various processing to be described later. The storage 108 may be a nonvolatile storage device such as a hard disk drive (HDD) or a solid state drive (SSD). The memory 106 may be a volatile storage device such as a DRAM (Dynamic Random Access Memory) or an SRAM (Static Random Access Memory).

The chipset 104 implements the processing for the whole CPU unit 100 by controlling the processor 102 and each device.

The storage 108 stores, in addition to a system program for implementing basic functions, a user program created for controlling a target such as a facility or a machine.

The network controller 110 exchanges data with any information processing device such as a gateway or a database server via the host network 8. The USB controller 112 exchanges data with a support device via a USB connection.

A memory card 116 may be inserted into and detached from the memory card interface 114, so that data may be written into the memory card 116 and various data (such as the user program and trace data) may be read out from the memory card 116.

The counter 126 is used as a time reference so as to manage the timing of executing various programs in the CPU unit 100. The counter 126 may be implemented by using a high-precision event timer (HPET) which is disposed on a system bus that drives the processor 102, or may be implemented by using a dedicated circuit such as an ASIC (Application Specific Integrated Circuit) or an FPGA (Field-Programmable Gate Array).

The RTC 128 is a counter which has a clock function and provides the current time to the processor 102 or the like.

The internal bus controller 118 corresponds to a communication interface that electrically connects one or more functional units and the CPU unit 100 via an internal bus 14. The internal bus controller 118 functions as a communication master that performs periodic communication via the internal bus 14.

The field network controller 120 corresponds to a communication interface that electrically connects one or more functional units and the CPU unit 100 via the field network 4. The field network controller 120 functions as a communication master that performs periodic communication via the field network 4.

FIG. 4 illustrates a configuration example in which the processor 102 provides necessary functions by executing a program. However, some or all of the functions may be provided by a dedicated hardware circuit (for example, an ASIC or an FPGA). Alternatively, the main part of the CPU unit 100 may be implemented by using hardware that conforms to a general-purpose architecture (for example, an industrial computer based on a general-purpose personal computer). In this case, virtualization technology may be used to run a plurality of operating systems (OS) having different applications in parallel to each other and run necessary applications on each OS.

Further, a configuration in which functions such as a display device and a support device are integrated in the CPU unit 100 may be employed.

(b2: Coupler Unit 200)

Figure 5:
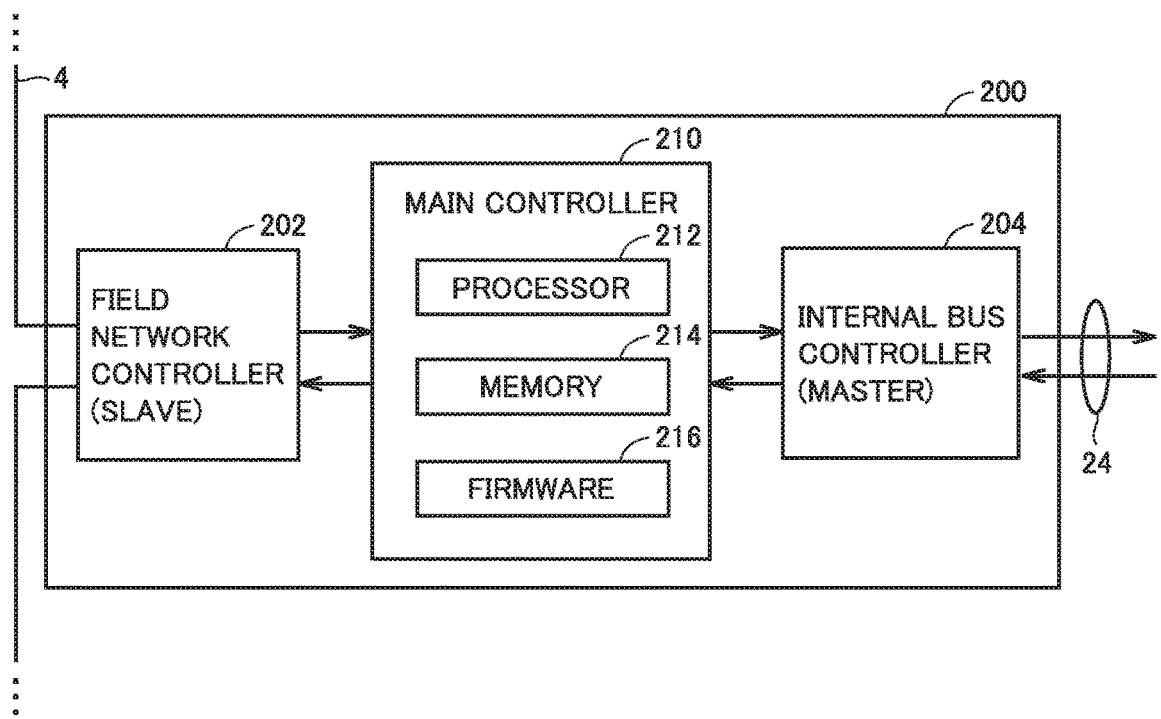
FIG. 5 is a block diagram illustrating a hardware configuration example of a coupler unit included in the control system according to the present embodiment.

FIG. 5 is a block diagram illustrating a hardware configuration example of the coupler unit 200 included in the control system 1 according to the present embodiment. With reference to FIG. 5, the coupler unit 200 includes a field network controller 202, a main controller 210, and an internal bus controller 204.

The field network controller 202 corresponds to a communication interface that electrically connects the coupler unit 200 and the CPU unit 100 via the field network 4. The field network controller 202 functions as a communication slave that participates in periodic communication via the field network 4.

The main controller 210 includes a processor 212, a memory 214, and a firmware 216. The processor 212 corresponds to an arithmetic processing unit that performs a control operation or the like, and includes a CPU, an MPU, a GPU and the like. Specifically, the processor 212 reads out the firmware 216 stored in the storage, deploys and executes the firmware 216 in the memory 214 so as to transfer data between the field network controller 202 and the internal bus controller 204 and perform the state management or the like to be described later.

The internal bus controller 204 corresponds to a communication interface that electrically connects one or more functional units and the coupler unit 200 via an internal bus 24. The internal bus controller 204 functions as a communication master that performs periodic communication via the internal bus 24.

(b3: Safety Controller 260)

Figure 6:
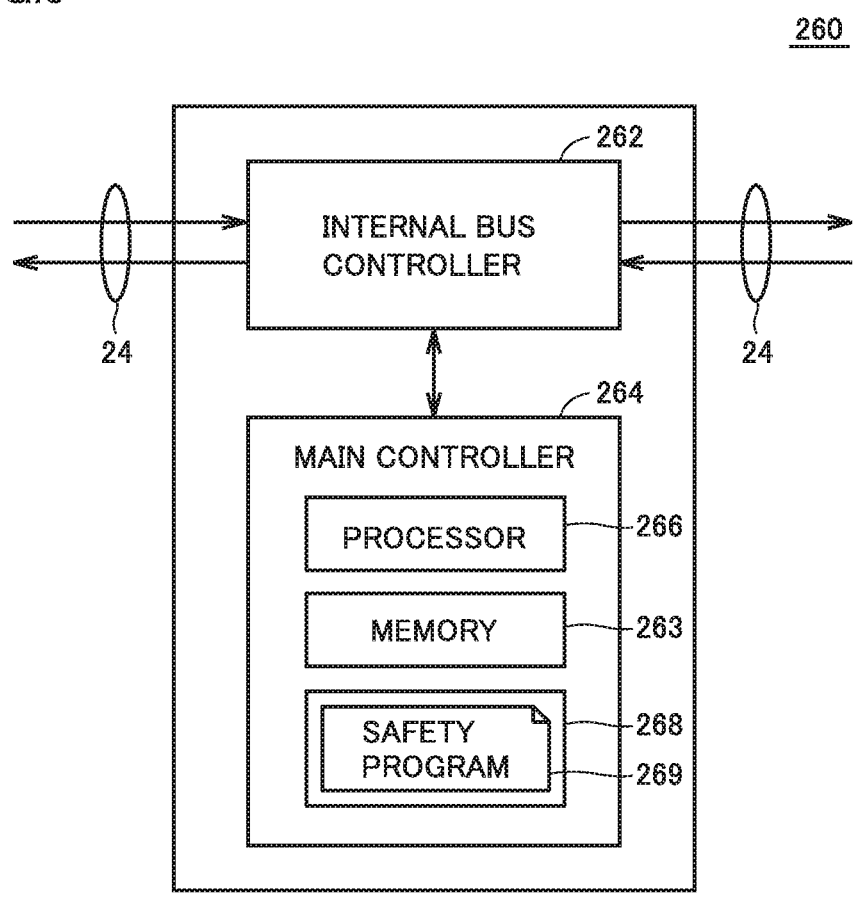
FIG. 6 is a block diagram illustrating a hardware configuration example of a safety controller included in the control system according to the present embodiment.

FIG. 6 is a block diagram illustrating a hardware configuration example of the safety controller 260 included in the control system 1 according to the present embodiment. With reference to FIG. 6, the safety controller 260 includes an internal bus controller 262 and a main controller 264.

The internal bus controller 262 corresponds to a communication interface that electrically connects the coupler unit 200 and the safety controller 260 via an internal bus 24. The internal bus controller 262 functions as a communication slave that participates in data communication via the internal bus 24.

The main controller 264 includes a processor 266, a memory 267, and a storage 268. The processor 266 corresponds to an arithmetic processing unit that performs a control operation or the like, and includes a CPU, an MPU, a GPU and the like. More specifically, the processor 266 reads out a safety program 269 stored in the storage 268, develops and executes the safety program 269 in the memory 267 so as to perform the safety control and the like.

(b4: Input/Output Units 150, 250 and Safety Input/Output Unit 270)

The hardware configuration of the input/output units 150 and 250 and the hardware configuration of the safety input/output unit 270 are the same as the hardware configuration of the safety controller 260 illustrated in FIG. 6, and the detailed description thereof will not be repeated. The same applies to the hardware configuration of the other functional units.

(b5: Safety Input/Output Unit 300)

The hardware configuration of the safety input/output unit 300 is a combination of the hardware configuration of the coupler unit 200 illustrated in FIG. 5 and the hardware configuration of the safety controller 260 illustrated in FIG. 6, and the detailed description thereof will not be repeated.

C. Area-Specific Control

Next, the area-specific control performed by the coupler unit 200 according to the present embodiment will be described. When a plurality of functional units are connected to the coupler unit 200, the area-specific control according to the present embodiment controls some of the functional units to operate independently of the other functional units.

Figure 7:
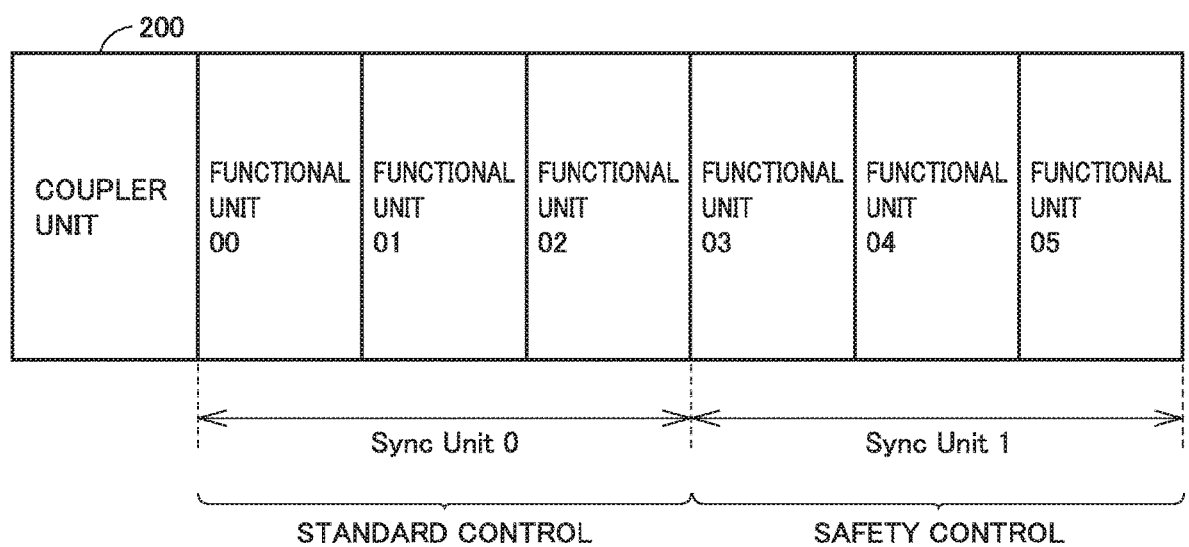
FIG. 7 is a schematic diagram illustrating an area-specific control performed by the coupler unit according to the present embodiment.

FIG. 7 is a schematic diagram illustrating the area-specific control performed by the coupler unit 200 according to the present embodiment. With reference to FIG. 7, for example, it is assumed that six functional units (functional units 00 to 05) are connected to the coupler unit 200. Among the six functional units, the first three functional units and the last three functional units may be configured to operate independently. The units that operate independently of each other are also referred to as "Sync Unit".

In the example illustrated in FIG. 7, the functional units 00 to 02 are referred to as "Sync Unit 0", and the functional units 03 to 05 are referred to as "Sync Unit 1". For example, the functional unit included in "Sync Unit 0" performs standard control using a communication frame transmitted periodically, and the functional unit included in "Sync Unit 1" performs safety control using a safety communication frame transmitted asynchronously.

As described above, the coupler unit 200 is provided with an individual configuration function that configures each of the plurality of functional units connected to the coupler unit 200 as a functional unit that uses a communication frame periodically transmitted for standard control (the first communication frame) or a functional unit that uses a safety communication frame (the second communication frame). Thus, the common coupler unit 200 may perform the standard control and the safety control separately by using the individual configuration function, in other words, by using the area-specific control.

D. Data Transmission Over Field Network

Next, the description will be carried out on the transmission of a communication frame periodically transmitted for standard control and a communication frame for safety control (safety communication frame) over the field network 4.

Figure 8:
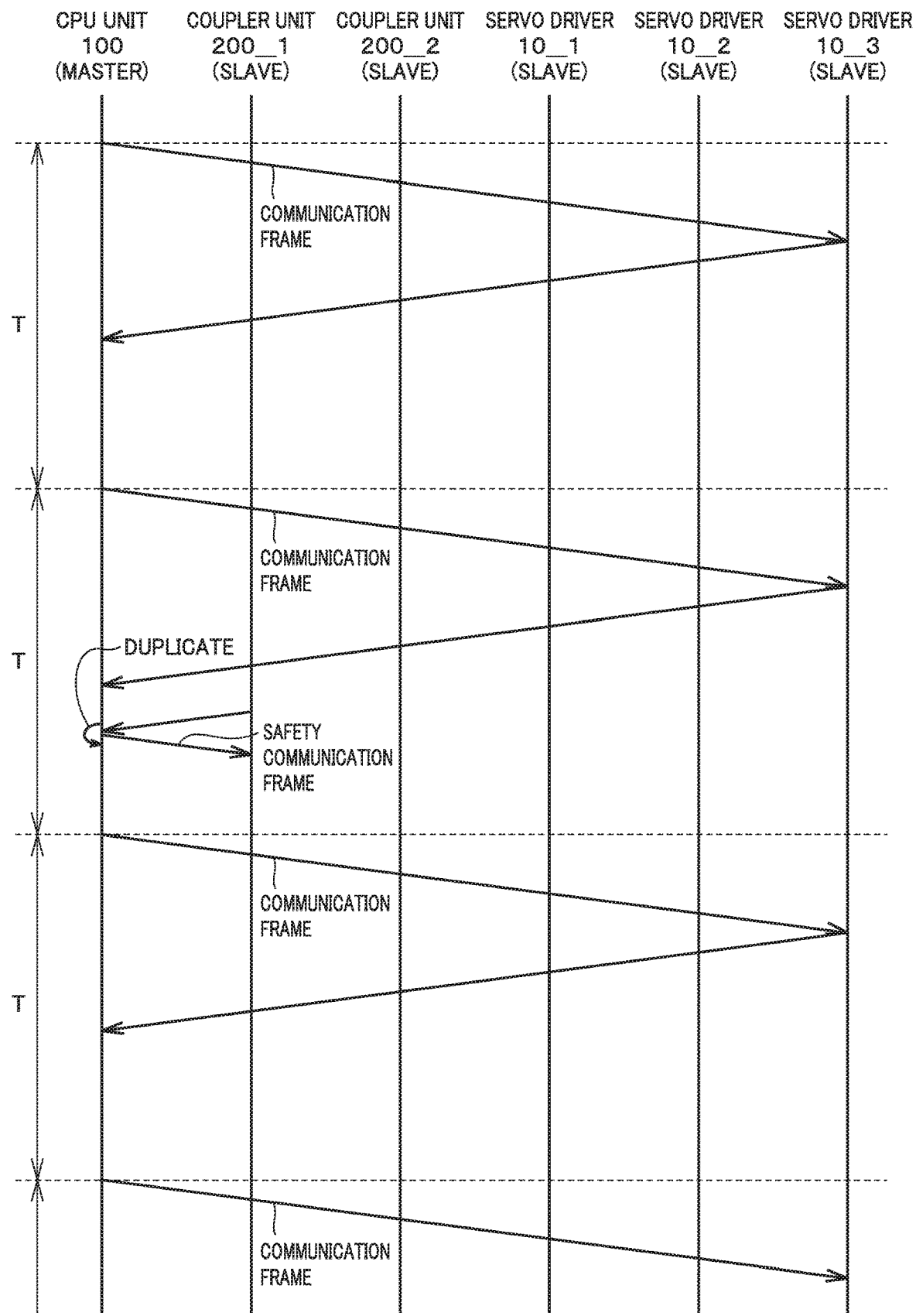
FIG. 8 is a schematic diagram illustrating the transmission of a communication frame in the control system according to the present embodiment.

FIG. 8 is a schematic diagram illustrating the transmission of a communication frame in the control system 1 according to the present embodiment. With reference to FIG. 8, a communication frame for standard control is transmitted from the CPU unit 100 which serves as a communication master at every predetermined frame transmission period T. The communication frame is sequentially transmitted between the communication slaves connected to the field network 4. When the communication frame reaches the terminal communication slave connected to the field network 4, the communication frame is looped from the terminal communication slave, sequentially passing through the other communication slaves connected to the field network 4 in the reverse direction back to the CPU unit 100, i.e., the communication master. Each time when a communication frame is being transmitted, each communication slave reads out necessary data from the communication frame and writes data into the communication frame.

The field network 4 illustrated in FIG. 8 is a non-circular field network, and when a circular field network 4 is employed, the communication frame transmitted from the CPU unit 100 circles the field network 4 and returns to the CPU unit 100.

On the other hand, a safety communication frame generated by the coupler unit 200_1 in response to a request from the safety controller 260 connected to the coupler unit 200_1 is firstly transmitted to the CPU unit 100 which serves as a communication master. Upon receiving the safety communication frame, the CPU unit 100 duplicates the received safety communication frame and transmits the duplicated safety communication frame to the safety input/output unit 270 connected to the coupler unit 200_1 as the original destination. Through such a route, the safety communication frame is transmitted from the transmission source to the transmission destination.

As described above, the coupler unit 200 transmits the safety communication frame (the second communication frame) to the CPU unit 100 in response to a request from the safety controller 260. On the other hand, the CPU unit 100 has a frame transmission function of transmitting the safety communication frame received from the coupler unit 200 to a destination field device.

As described above, the field network 4 of the control system 1 according to the present embodiment can transmit synchronous frames and asynchronous frames in a mixed manner.

E. State Switching of Coupler Unit 200

Next, example states that the coupler unit 200 according to the present embodiment may take will be described.

Figure 9:
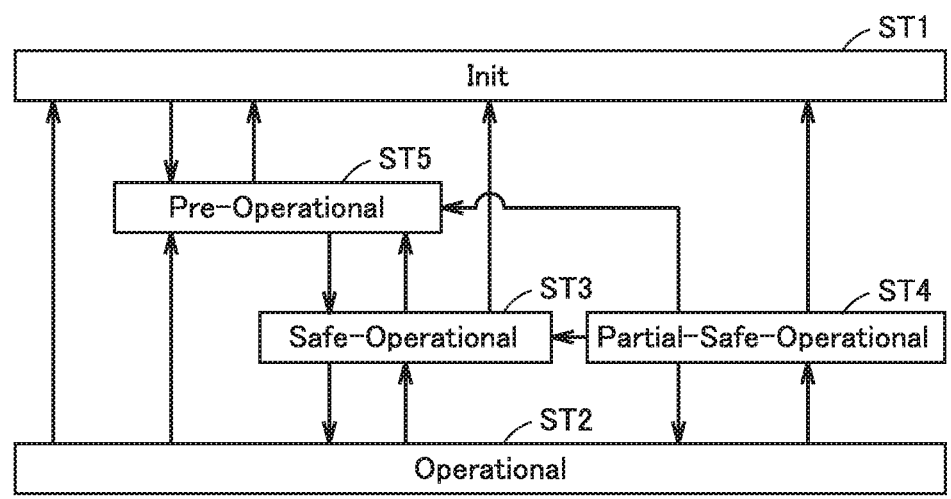
FIG. 9 is a diagram illustrating a state switching example of the coupler unit according to the present embodiment.

FIG. 9 is a diagram illustrating an example state switching of the coupler unit 200 according to the present embodiment. The example state switching illustrated in FIG. 9 is based on an EtherCAT state machine (ESM).

With reference to FIG. 9, the coupler unit 200 includes, as state values, an NIT state (ST1), an operational state (ST2), a safe-operational state (ST3), a partial-safe-operational state (ST4), a pre-operational state (ST5).

The INIT state (ST1) is an initial state in which no communication may be performed.

The operational state (ST2) is a normal operation state in which input data (measured values) and output data (commands) may be transmitted. At this time, message transmission is also possible.

The safe-operational state (ST3) is a state which is switched to when an error is present and in which the transmission of input data (measured value) and messages are possible. In this state, the input of data (input refresh) of the functional unit is enabled, but the output of data (output refresh) is in the "safe" state and is stopped.

The partial-safe-operational state (ST4) is a state in which the area-specific control is enabled, and which corresponds to a state in which the operational state and the safe-operational state are mixed. In other words, among a plurality of functional units connected to the same coupler unit 200, one or more functional units configured as a Sync Unit are in the operational state, and one or more functional units configured as another Sync Unit are in the safe-operational state.

The pre-operational state (ST5) is a state in which only message transmission is possible.

The coupler unit 200 which serves as a communication slave according to the present embodiment may be switched between the five states described above in response to different situations.

F. Problems to be Solved

Next, the problems to be solved by the control system 1 having the configuration and functions described above according to the present embodiment will be described.

In the control system 1 according to the present embodiment, the functional units that perform standard control and the functional units that perform safety control may be connected to the same coupler unit 200 that serves as a communication slave. In the related art, such a configuration may cause the following problems.

Figure 10:
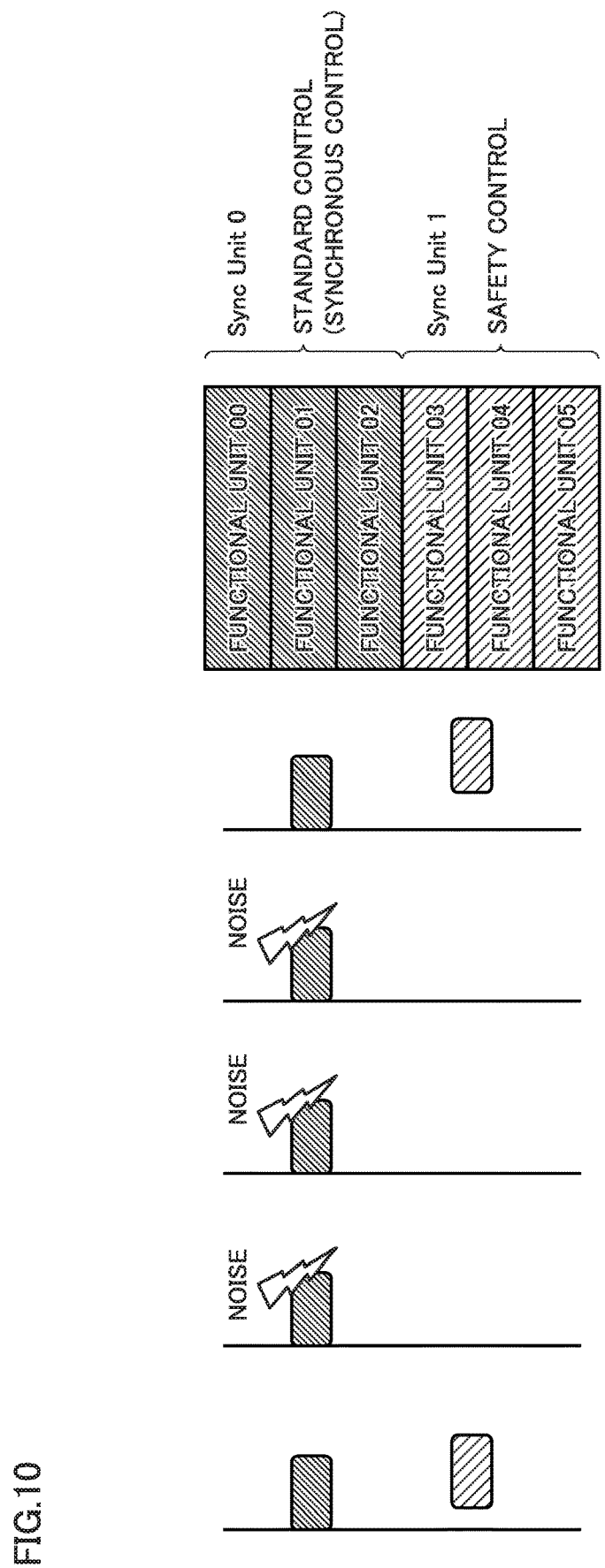
FIG. 10 is a schematic diagram for explaining a problem to be solved by the control system according to the present embodiment.

FIG. 10 is a schematic diagram for explaining a problem to be solved by the control system 1 according to the present embodiment. In FIG. 10, similarly to FIG. 7 described above, the functional units 00 to 02 are configured as "Sync Unit 0" that performs the standard control, and the functional units 03 to 05 are configured as "Sync Unit 1" that performs the safety control. Here, Sync Unit 0 is set to use a periodically transmitted communication frame (synchronization control mode), and Sync Unit 1 is set to use an asynchronously transmitted safety communication frame. The synchronization control mode is a mode in which a command is calculated in synchronization with the communication frame that is transmitted periodically, and is directed to, for example, an application such as motion control in which a command must be updated frequently in a very short period.

With such a configuration, in the related art, for example, when the reception failure of the communication frame in the process of Sync Unit 0 continues for a predetermined period due to the influence of noise or the like, the coupler unit 200 serving as the communication slave determines that the requirements required for the synchronization control mode are not satisfied, and detects that a transmission error (synchronization error) is present. Then, the coupler unit 200 switches its state to the safe-operational state (ST3 illustrated in FIG. 9). As a result, even if there is no data transmission error in the safety communication frame used by Sync Unit 1, the safety control by Sync Unit 1 is stopped.

On the contrary, in the coupler unit 200 according to the present embodiment, even when a transmission error is detected, if the transmission of the safety communication frame is normal, the functional units (Sync Unit(s)) that use the safety communication frame will be controlled to continue operation.

In other words, the coupler unit 200 according to the present embodiment may be switched to either a state in which the operation is stopped or a state in which the operation is continued based on the communication frame used by the connected functional units.

Figure 11:
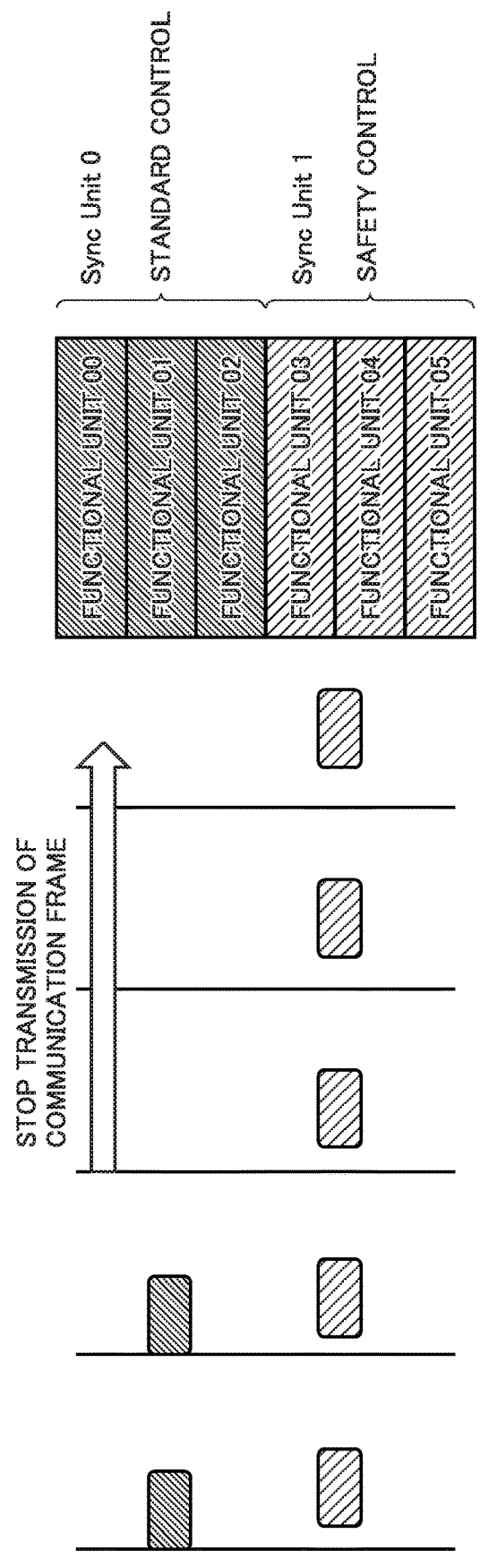
FIG. 11 is a schematic diagram for explaining another problem to be solved by the control system according to the present embodiment.

FIG. 11 is a schematic diagram for explaining another problem to be solved by the control system 1 according to the present embodiment. Similar to FIG. 7 described above, in the example illustrated in FIG. 11, the functional units 00 to 02 are configured as "Sync Unit 0" that performs the standard control, and the functional units 03 to 05 are configured as "Sync Unit 1" that performs the safety control.

With reference to FIG. 11, for example, when the CPU unit 100 which serves as a communication master stops transmitting a communication frame which is periodically transmitted for the standard control due to the maintenance or an error, if the period during which a communication frame cannot be received is longer than a predetermined period, the coupler unit 200 serving as a communication slave detects that there is a transmission error (WDT (WatchDog Timer) error), and switches to the safe-operational state (ST3 illustrated in FIG. 9). As a result, even if there is no data transmission error in the safety communication frame used by Sync Unit 1, the safety control by Sync Unit 1 is stopped.

On the contrary, in the coupler unit 200 according to the present embodiment, even when a transmission error is detected, if the transmission of the safety communication frame is normal, the functional units (Sync Unit(s)) that use the safety communication frame will be controlled to continue operation.

In other words, the coupler unit 200 according to the present embodiment may be switched to either a state in which the operation is stopped or a state in which the operation is continued based on the communication frame used by the connected functional units.

G. Process Performed by Coupler Unit 200

Next, a process performed by the coupler unit 200 which serves as a communication slave of the control system 1 according to the present embodiment will be described.

Figure 12:
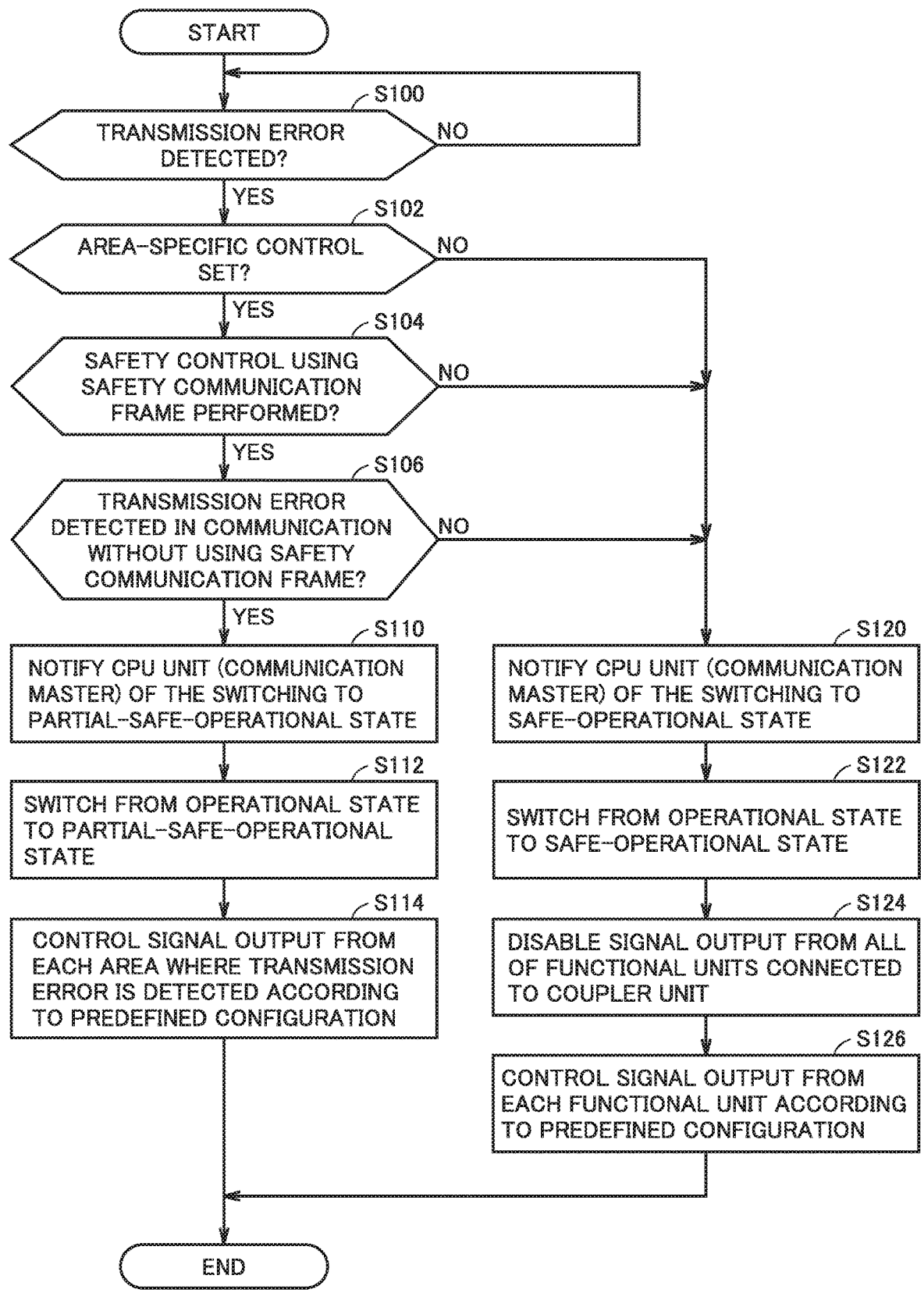
FIG. 12 is a flowchart illustrating a process performed by the coupler unit in the control system according to the present embodiment.

FIG. 12 is a flowchart illustrating a process performed by the coupler unit 200 of the control system 1 according to the present embodiment. Each step illustrated in FIG. 12 may be realized by the processor 212 of the coupler unit 200 executing the firmware 216.

With reference to FIG. 12, the coupler unit 200 determines whether or not a transmission error is present by monitoring the periodic reception of a communication frame (step S100). As an approach of monitoring the periodic reception of a communication frame, at least one of an approach of detecting a synchronization error as illustrated in FIG. 10 and an approach of detecting a WDT error as illustrated in FIG. 11 may be used.

In the case where the control is set to use the communication frame transmitted periodically (synchronization control mode), the synchronization error illustrated in FIG. 10 is detected when the reception failure of the communication frame continues for a predetermined period, in other words, the communication frame has not been received over a predetermined period.

The WDT error illustrated in FIG. 11 is detected when the period during which a communication frame cannot be received has exceeded a predetermined period, in other words, the communication frame has not been received over a predetermined period.

If no transmission error is present (NO in step S100), the process of step S100 is repeated.

On the other hand, when a transmission error is detected (YES in step S100), the coupler unit 200 switches its state to either a first state (the safe-operational state in FIG. 9) in which the signal output from all of the functional units connected to the coupler unit 200 is disabled or a second state (the partial-safe-operational state in FIG. 9) in which the signal output from some of the functional units connected to the coupler unit 200 is continuously updated based on the configuration of each functional unit connected to the coupler unit 200.

More specifically, the coupler unit 200 determines whether or not the area-specific control is set (step S102). If the area-specific control is not set (NO in step S102), the coupler unit 200 executes the processing in step S120 and subsequent steps.

If the area-specific control is set (YES in step S102), the coupler unit 200 determines whether or not the safety control using the safety communication frame is performed (step S104). If the safety control using the safety communication frame is not performed (NO in step S104), the coupler unit 200 executes the processing in step S120 and subsequent steps.

If the safety control using the safety communication frame is performed (YES in step S104), the coupler unit 200 determines whether or not the detected transmission error is in a communication without using the safety communication frame (step S106). If the detected transmission error is in the communication using the safety communication frame (NO in step S106), the coupler unit 200 executes the processing in step S120 and subsequent steps.

If the detected transmission error is in a communication without using the safety communication frame (YES in step S106), the coupler unit 200 notifies the CPU unit 100 which serves as the communication master of the switching to the partial-safe-operational state (step S110), and switches its state from the operational state to the partial-safe-operational state (Step S112). Then, the coupler unit 200 controls the signal output from the area where the transmission error is detected (in other words, one or more functional units included in a target Sync Unit) according to the configuration (step S114). Then, the process of the communication error detection is ended.

In such a partial-safe-operational state, the safety controller 260 continues to transmit the safety communication frame and update the signal output. In addition, the safety input/output unit 270 will continue to update the signal output. In other words, the safety control is continued.

On the other hand, in step S120, the coupler unit 200 notifies the CPU unit 100 which is the communication master of the switching to the safe-operational state to (step S120), and switches its state from the operational state to the safe-operational state (Step S122). Along with the switching of state, the coupler unit 200 disables the signal outputs from all of the functional units connected to the coupler unit 200 (step S124). Subsequently, the coupler unit 200 controls the signal output of each functional unit according to the configuration (Step S126). Then, the process of the communication error detection is ended.

In transmitting the notification to the CPU unit 100 in steps S110 and S120 as described above in the process, it is preferred that the content of the notification is transmitted in such a manner that the respective state may be identified.

Figure 13:
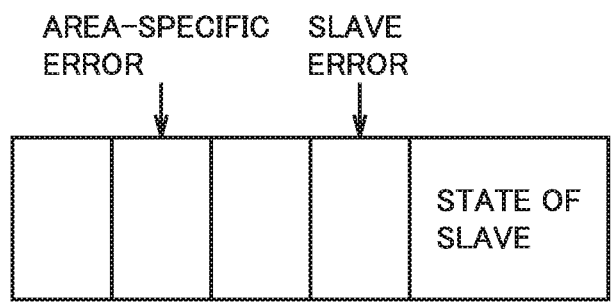
FIG. 13 is a schematic diagram illustrating a part of a notification frame transmitted from the coupler unit to the CPU unit in the control system according to the present embodiment.

FIG. 13 is a schematic diagram illustrating a part of a notification frame transmitted from the coupler unit 200 to the CPU unit 100 of the control system 1 according to the present embodiment. With reference to FIG. 13, the notification frame indicating the state of a communication slave includes at least a bit of "slave error" and a bit of "area-specific error". The "slave error" is related to the safe-operational state, and when it is TRUE, it means that the state is switched to the safe-operational state. The "area-specific error" is related to the partial-safe-operational state, and when it is TRUE, it means that the state is switched to the partial-safe-operational state.

An AL status frame used in EtherCAT may be used as the notification frame illustrated in FIG. 13. Since the AL status frame includes a reserved or unused bit, and by assigning "area-specific error" to the unused bit, it is possible to maintain the compatibility with an existing system.

Typically, the processing that controls the signal output according to the configuration in steps S114 and S126 as described above in the process may be set to output a default value (for example, "ON" (Normally on) or "OFF" (normally off) for a digital output). Alternatively, it is possible to maintain the value that is output immediately before the occurrence of the transmission error. Alternatively, it is possible to reflect the output data that is received immediately before the occurrence of the transmission error.

Further, it is possible to output a value corresponding to the type or usage of each functional unit with reference to the information (profile information) of the functional units connected to the coupler unit 200.

H. Functional Components of Coupler Unit 200

Next, functional components of the coupler unit 200 which serves as a communication slave in the control system 1 according to the present embodiment will be described.

Figure 14:
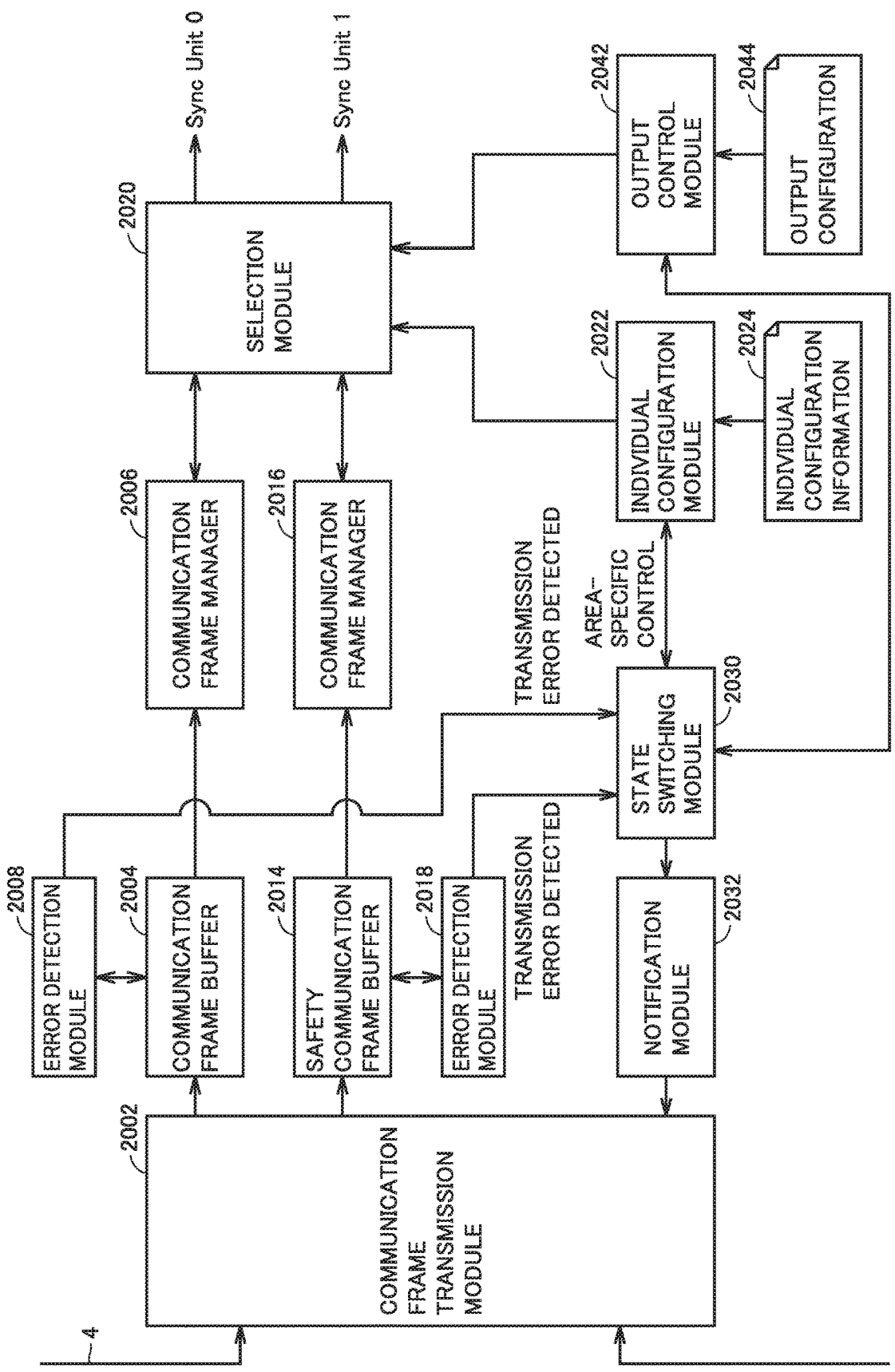
FIG. 14 is a schematic diagram illustrating functional components of the coupler unit in the control system according to the present embodiment.

FIG. 14 is a schematic diagram illustrating functional components of the coupler unit 200 of the control system 1 according to the present embodiment. Each module illustrated in FIG. 14 may be realized by the processor 212 of the coupler unit 200 executing the firmware 216.

With reference to FIG. 14, the coupler unit 200 includes, as its functional components, a communication frame transmission module 2002, a communication frame buffer 2004, a communication frame manager 2006, an error detection module 2008, a safety communication frame buffer 2014, a safety communication frame manager 2016, an error detection module 2018, a selection module 2020, an individual configuration module 2022, a state switching module 2030, a notification module 2032, and an output control module 2042.

The communication frame transmission module 2002 manages reception and transmission of a communication frame and a safety communication frame which are transmitted over the field network 4. The communication frame transmission module 2002 outputs the communication frame and the safety communication frame received from the previous stage to the respective buffers, writes necessary data into the received communication frame and the received safety communication frame, and transmits the same to a next stage.

The communication frame buffer 2004 buffers the communication frame received from the communication frame transmission module 2002 and buffers data (input data/measured values) collected by the functional unit that performs the standard control.

The communication frame manager 2006 provides the communication frame buffered in the communication frame buffer 2004 to a functional unit using the communication frame, and generates data to be written into the received communication frame in response to a request from a functional unit using the communication frame.

The error detection module 2008 detects a transmission error by monitoring the periodic reception of the communication frame. More specifically, the error detection module 2008 detects a synchronization error or a WDT error by monitoring a time interval or a time period between the reception of a previous communication frame and the reception of a subsequent communication frame.

The safety communication frame buffer 2014 buffers the safety communication frame received from the communication frame transmission module 2002, data (input data/measured values) collected by the functional unit that performs the safety control, and a request from the functional unit that performs the safety control.

The safety communication frame manager 2016 provides the safety communication frame buffered in the safety communication frame buffer 2014 to a functional unit using the safety communication frame, and generates data for configuring the safety communication frame in response to a request from a functional unit using the safety communication frame.

The error detection module 2018 detects a transmission error in the safety communication frame by monitoring the reception of the safety communication frame.

The selection module 2020 selects a functional unit to be logically coupled with the communication frame manager 2006 and the safety communication frame manager 2016.

The individual configuration module 2022 controls the selection module 2020 to select a functional unit with reference to individual configuration information 2024 prepared in advance. As described above, the individual configuration module 2022 cooperates with the selection module 2020 to configure each of a plurality of functional units connected to the coupler unit 200 as a functional unit using the communication frame or a functional units using the safety communication frame.

The state switching module 2030 switches the state of the coupler unit 200 based on the event of transmission error detection from the error detection module 2008 and the error detection module 2018 and the information of the area-specific control on the function module from the individual configuration module 2022. More specifically, when a transmission error is detected by the error detection module 2008, the state switching module 2030 switches the state of the coupler unit 200 to either a first state (safe-operational state illustrated in FIG. 9) in which the signal output from all of the functional units connected to the coupler unit 200 is disabled or a second state (partial-safe-operational state illustrated in FIG. 9) in which the signal output from some of the functional units connected to the coupler unit 200 is continuously updated based on the configuration of each functional unit connected to the coupler unit 200.

Note that when a transmission error is detected by the error detection module 2018, the state switching module 2030 switches the state of the coupler unit 200 to the first state (safe-operational state illustrated in FIG. 9) in which the signal output of all of the functional units connected to the coupler unit 200 is disabled. In other words, when a transmission error is detected in the safety communication frame, the error is considered to be more serious than the transmission error in the communication frame for the standard control, and thereby, the state is switched to the safe-operational state.

The notification module 2032 notifies the communication master of the state switched by the state switching module 2030. More specifically, the notification module 2032 notifies the CPU unit 100 of information indicating the state to be switched to when the transmission error is detected by the error detection module 2008. The notification may be sent by using the notification frame described above with reference to FIG. 13.

The output control module 2042 controls the value of the signal output from each functional unit connected to the coupler unit 200 in response to the state switched by the state switching module 2030. More specifically, the output control module 2042 determines the content of the signal output for each functional unit whose signal output is disabled according to a predetermined output configuration 2044.

The switching of state according to the present embodiment is implemented by the functional components described above.

I. Others

The threshold time for detecting a transmission error (WDT error) described above may be individually set for each Sync Unit. Each threshold time may set by employing the message transmission from the CPU unit 100 which serves as the communication master to the coupler unit 200.

The behavior when a transmission error is detected and the signal output from the functional units is disabled may be set in advance for each Sync Unit or each functional unit.

As illustrated in the process of FIG. 12, in the partial-safe-operational state, some of the functional units continue updating the signal output. However, if the signal output is disabled for all of the functional units due to the detection of a transmission error for a plurality of times, it is not necessary to maintain the partial-safe-operational state, and the state may be automatically switched to the safe-operational state.

In setting the area-specific control, the switching to the partial-safe-operational state may be enabled or disabled for each Sync Unit. After the switching to the partial-safe-operational state is disabled, if a transmission error is detected, similar to the related art, the state is switched to the safe-operational state without passing through the partial-safe-operational state.

J. Notes

The present embodiment as described above includes the following technical ideas.

[Configuration 1]

A control system that includes:

a control device (100) that functions as a communication master;

a junction device (200) that is connected via a network to the control device; and one or more field devices (10) that are connected via a network to the control device, the junction device is connected to one or more functional units (250, 260), the control device includes a transmission management means (120) that manages the periodic transmission of a first communication frame in the network, the junction device includes:

a first error detection means (2008) that detects a transmission error by monitoring the periodic reception of the first communication frame; and a state switching means (2030) that switches, when a transmission error is detected by the first error detection means, a state of the junction device to either a first state (ST3) in which the signal output from all of the functional units connected to the junction device is disabled or a second state (ST4) in which the signal output from some of the functional units connected to the junction device is continuously updated based on the configuration of each functional unit connected to the junction device.

[Configuration 2]

In the control system according to configuration 1, the one or more functional units include at least one of a safety controller (260) and a safety input/output unit (270), and the safety controller and the safety input/output unit continue updating the signal output in the second state.

[Configuration 3]

In the control system according to configuration 2, the safety controller and the safety input/output unit exchange data with the field device using a second communication frame different from the first communication frame that is transmitted periodically.

[Configuration 4]

In the control system according to configuration 3, the junction device transmits the second communication frame to the control device in response to a request from at least one of the safety controller and the safety input/output unit, and the control device further includes a frame transmission means (120) that transmits the second communication frame received from the junction device to the field device.

[Configuration 5]

In the control system according to configuration 3 or 4, the junction device further includes an individual configuration means (2022) that configures each of the functional units connected to the junction device as a functional unit that uses the first communication frame or a functional unit that uses the second communication frame.

[Configuration 6]

In the control system according to any one of configurations 3 to 5, the junction device further includes a second error detection means (2018) that detects a transmission error in the second communication frame, and the state switching means switches a state of the junction device to the first state when a transmission error is detected by the second error detection means.

[Configuration 7]

In the control system according to any one of configurations 1 to 6, the junction device further includes a notification means (2032) that notifies the control device of information indicating a state to be switched to when a transmission error is detected by the first error detection means.

[Configuration 8]

In the control system according to any one of configurations 1 to 7, the junction device further includes an output determination means (2042) that determines the content of a signal output for a functional unit according to a predefined configuration after the signal output of the functional unit is disabled.

[Configuration 9]

A communication control method for a control system (1), the control system includes a control device (100) that functions as a communication master, a junction device (200) that is connected via a network to the control device, and one or more field devices (10) that are connected via a network to the control device, and the junction device is connected to one or more functional units (250, 260, 270), the communication control method includes:

managing the periodic transmission of a first communication frame in the network;

detecting a transmission error by using the junction device to monitor the periodic reception of the first communication frame (S100); and switching, when a transmission error is detected in the first communication frame, a state of the junction device to either a first state (ST3) in which the signal output from all of the functional units connected to the junction device is disabled or a second state (ST4) in which the signal output from some of the functional units connected to the junction device is continuously updated based on the configuration of each functional unit connected to the junction device (S102 to S106).

[Configuration 10]

A junction device (200) included in a control system (1), the control system includes a control device (100) that is connected to the junction device via a network and functions as a communication master, and one or more field devices (10) that are connected to the control device via a network, the junction device is connected to one or more functional units (250, 260, 270), the control device includes a transmission management means (120) that manages the periodic transmission of a first communication frame in the network, the junction device includes:

a first error detection means (2008) that detects a transmission error by monitoring the periodic reception of the first communication frame; and a state switching means (2030) that switches, when a transmission error is detected by the first error detection means, a state of the junction device to either a first state (ST3) in which the signal output from all of the functional units connected to the junction device is disabled or a second state (ST4) in which the signal output from some of the functional units connected to the junction device is continuously updated based on the configuration of each functional unit connected to the junction device.

K. Advantages

The control system according to the present embodiment sets an area-specific control for a coupler unit to which a plurality of functional units are connected, and in the case where the communication frames to be used by the respective control are different to each other, even when a transmission error is detected in the communication frame used by one control, if the transmission of the communication frame used by the other control is normal, the other control is continued without being stopped. Thus, in a control system that realizes different controls using a common coupler unit, it is possible to rationally perform the detection of a transmission error and necessary measures accordingly.

The controls described above, for example, may include a combination of standard control requiring high-speed and synchronous communication and safety control requiring low-speed and asynchronous communication. In the standard control, if synchronization cannot be maintained due to the lost or configuration change of a communication frame, a synchronization error may occur. However, since an asynchronous communication frame may be used in the safety control, the state may be switched to a particular state in which the safety control only is maintained.

When the communication frame is not received due to the stop of an application (for maintenance or a fatal error) related to the standard control in the master device serving as the communication master, the error is detected at the communication slave side. Even in such a case, since an asynchronous communication frame may be used in the safety control, the state is switched to a particular state in which the safety control only is maintained.

As described above, in the control system 1 according to the present embodiment, a plurality of functional units are connected to a common coupler unit, these functional units are used to perform different controls, and the controls may be made independent of each other so that a transmission error in one control may have the least influence on the other control.

It should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

REFERENCE SIGNS LIST

1: control system; 2: master device; 4: field network; 6: remote IO device; 8: host network; 10: servo driver; 12: servo motor; 14, 24: internal bus; 100: CPU unit; 102, 212, 266: processor; 104: chipset; 106, 214, 267: memory; 108, 268: storage; 110: network controller; 112: USB controller; 114: memory card interface; 116: memory card; 118, 204, 262: internal bus controller; 120, 202: field network controller; 126: counter; 128: RTC; 150, 250: input/output unit; 200: coupler unit; 210, 264: main controller; 216: firmware; 260: safety controller; 269: safety program; 270, 300: safety input/output unit; 2002: communication frame transmission module; 2004: communication frame buffer; 2006: communication frame manager; 2008, 2018: error detection module; 2014: safety communication frame buffer; 2016: safety communication frame manager; 2020: selection module; 2022: individual configuration module; 2024: individual configuration information; 2030: state switching module; 2032: notification module; 2042: output control module; 2044: output configuration; T: frame transmission period

The invention claimed is:

1. A control system comprising:
a control device that functions as a communication master;
a junction device that is connected via a network to the control device; and
one or more field devices that are connected via a network to the control device, wherein
the junction device is connected to one or more functional units,
the control device is configured to perform operations comprising managing the periodic transmission of a first communication frame in the network, and
the junction device is configured to perform operations comprising:
detecting a transmission error by monitoring the periodic reception of the first communication frame; and
switching, when a transmission error is detected, a state of the junction device to either a first state in which the signal output from all of the functional units connected to the junction device is disabled or a second state in which the signal output from some of the functional units connected to the junction device is continuously updated based on the configuration of each functional unit connected to the junction device.

2. The control system according to claim 1, wherein
the one or more functional units include at least one of a safety controller and a safety input/output unit, and
the safety controller and the safety input/output unit continue updating the signal output in the second state.

3. The control system according to claim 2, wherein
the safety controller and the safety input/output unit exchange data with the field device using a second communication frame different from the first communication frame that is transmitted periodically.

4. The control system according to claim 3, wherein
the junction device transmits the second communication frame to the control device in response to a request from at least one of the safety controller and the safety input/output unit, and the control device is configured to perform operations further comprising transmitting the second communication frame received from the junction device to the field device.

5. The control system according to claim 3, wherein the junction device the junction device is configured to perform operations further comprising configuring each of the functional units connected to the junction device as a functional unit that uses the first communication frame or a functional unit that uses the second communication frame.

6. The control system according to claim 3, wherein the junction device is configured to perform operations further comprising
detecting a transmission error in the second communication frame, and
switching the state of the junction device to the first state when a transmission error is detected.

7. The control system according to claim 1, wherein the junction device is configured to perform operations further comprising notifying the control device of information indicating a state to be switched to when a transmission error is detected.

8. The control system according to claim 1, wherein the junction device is configured to perform operations further comprising determining the content of a signal output for a functional unit according to a predefined configuration after the signal output of the functional unit is disabled.

9. A communication control method for a control system, the control system comprising a control device that functions as a communication master, a junction device that is connected via a network to the control device, and one or more field devices that are connected via a network to the control device, and
the junction device being connected to one or more functional units,
the communication control method comprising:
managing, at the control device, the periodic transmission of a first communication frame in the network;
detecting, at the junction device, a transmission error by using the junction device to monitor the periodic reception of the first communication frame; and
switching, at the junction device, when a transmission error is detected in the first communication frame, a state of the junction device to either a first state in which the signal output from all of the functional units connected to the junction device is disabled or a second state in which the signal output from some of the functional units connected to the junction device is continuously updated based on the configuration of each functional unit connected to the junction device.

10. The communication control method according to claim 9, wherein
the one or more functional units include at least one of a safety controller and a safety input/output unit, and
the safety controller and the safety input/output unit continue updating the signal output in the second state.

11. The communication control method according to claim 10, wherein
the safety controller and the safety input/output unit exchange data with the field device using a second communication frame different from the first communication frame that is transmitted periodically.

12. The communication control method according to claim 11, further comprising:
transmitting, at the junction device, the second communication frame to the control device in response to a request from at least one of the safety controller and the safety input/output unit; and
transmitting, at the control device, the second communication frame received from the junction device to the field device.

13. The communication control method according to claim 12, further comprising
configuring, at the junction device, each of the functional units connected to the junction device as a functional unit that uses the first communication frame or a functional unit that uses the second communication frame.

14. The communication control method according to claim 11, further comprising:
detecting, at the junction device, a transmission error in the second communication frame, and
switching, at the junction device, the state of the junction device to the first state when a transmission error is detected.

15. The communication control method according to claim 9, further comprising
notifying, at the junction device, the control device of information indicating a state to be switched to when a transmission error is detected.

16. The communication control method according to claim 9, further comprising
determining, at the junction device, the content of a signal output for a functional unit according to a predefined configuration after the signal output of the functional unit is disabled.

17. A junction device included in a control system, the control system comprising a control device that is connected to the junction device via a network and functions as a communication master, and one or more field devices that are connected to the control device via a network, and
the junction device being connected to one or more functional units, wherein
the control device is configured to perform operations comprising managing the periodic transmission of a first communication frame in the network,
the junction device being configured to perform operations comprising:
detecting a transmission error by monitoring the periodic reception of the first communication frame; and
switching, when a transmission error is detected, a state of the junction device to either a first state in which the signal output from all of the functional units connected to the junction device is disabled or a second state in which the signal output from some of the functional units connected to the junction device is continuously updated based on the configuration of each functional unit connected to the junction device.

* * * * *